Nov. 11, 1924.　　　　　P. H. LEWIS　　　　　1,515,501

ICE CREAM CABINET

Filed Feb. 12, 1923

Inventor
P. H. Lewis
by Wilkinson
& Giusta
Attorneys

Patented Nov. 11, 1924.

1,515,501

UNITED STATES PATENT OFFICE.

PHIL H. LEWIS, OF MEMPHIS, TENNESSEE.

ICE-CREAM CABINET.

Application filed February 12, 1923. Serial No. 618,603.

*To all whom it may concern:*

Be it known that I, PHIL H. LEWIS, a citizen of the United States, residing at Memphis, in the county of Shelby and State of Tennessee, have invented certain new and useful Improvements in Ice-Cream Cabinets; and I do hereby declare the following to be a full, clear, and exact description of the invention, such as will enable others skilled in the art to which it appertains to make and use the same.

My invention relates to improvements in cabinets for containing frozen foodstuffs, such as ice-cream frozen custards, sherbets, or the like, which are intended to be kept in a frozen form and distributed as used. With such food, it is essential not only to keep the goods in the frozen state, but also to have the same conveniently accessible to be dispensed in small or large packages, as desired, and at the same time to render the whole apparatus as sanitary as practicable.

Figure 1:
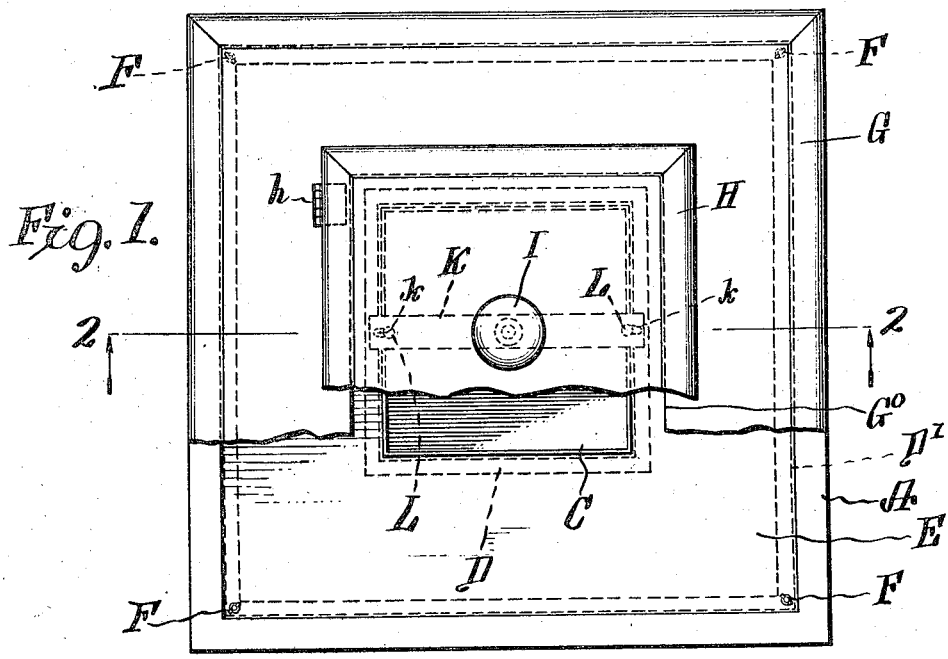
Figure 2:
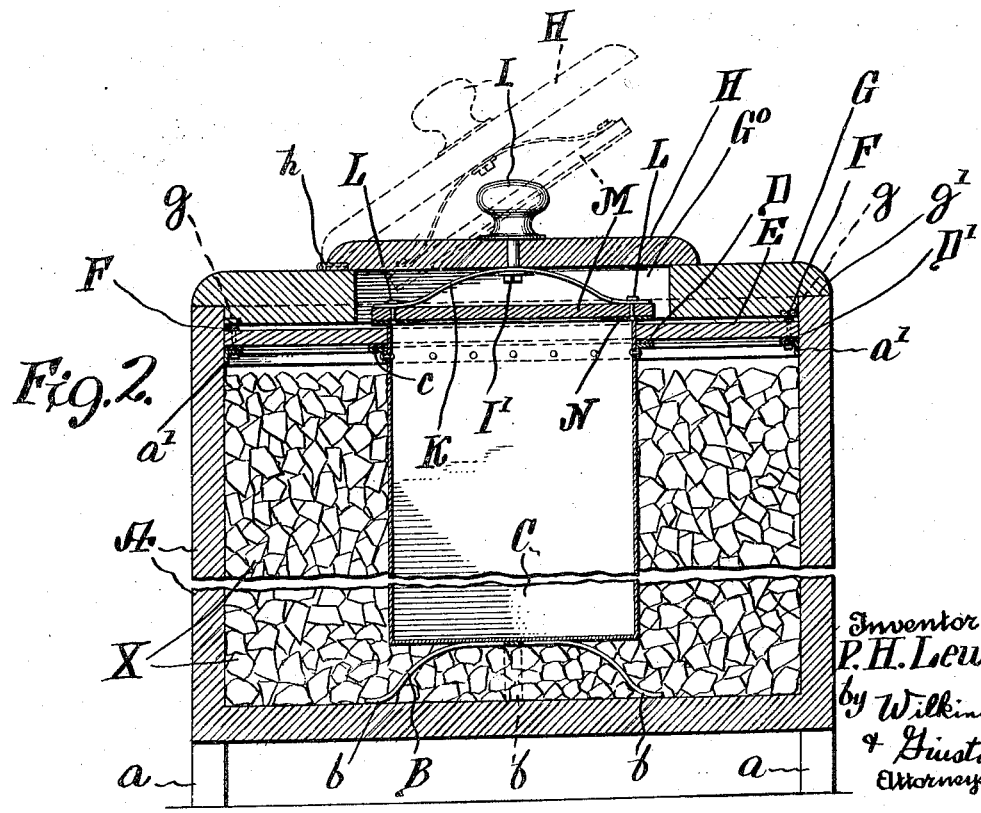

These and other desirable results are accomplished in the use of the apparatus shown in the accompanying drawings, in which like parts are indicated by similar reference symbols throughout the several views, and in which:

Figure 1 is a plan view of the apparatus with the lid closed, and the parts being broken away, and Figure 2 shows a section along the line 2—2 of Fig. 1, and looking in the direction of the arrows.

A represents a rectangular chest, which may be made of wood or other suitable insulating material, and which is preferably mounted on suitable legs $a$. Near the top of this chest I provide an angle iron $a'$. Mounted in the bottom of the chest is a spacing frame or seat B for the receptacle C containing the frozen mixture. This seat is preferably made of a series of springs, spacing the bottom of the receptacle from the bottom of the other chest or container, thus permitting the ice or freezing mixture X to completely surround the container, as shown.

The container C is shown as rectangular in cross-section, and is provided near its top with an angle iron $c$. Above the angle irons $c$ and $a'$ rectangular rubber gaskets D and D' are placed, and above these the inner cover E is mounted, which cover is shown as connected to the angle iron $a'$ by means of the butterfly nuts or clamps F.

G represents the outer cover of the chest, which is provided with notches $g$ to receive the heads of the clamps F, and is shouldered as at $g'$ to fit snugly over the top of the chest A.

This cover G is centrally perforated at $G^0$, and the open space is closed by the lid H, which is hinged to the cover G as at $h$, and is provided with a knob or handle I attached to the bolt I'. The lower end of this bolt engages a spring K, which is secured to the suction cap M by means of the screws L, which screws project into slots $k$ of the spring K, so as to permit the compression of the same. Attached to the lower face of the cap M is a rubber gasket N, which gasket fits snugly over the top of the container C, so that when the lid H is down, an air-tight joint is made between the cap and the container, which joint is kept tight by the upward pressure of the springs $b$ and the downward pressure of the spring K, in addition to the suction effect, which will be hereinafter described.

The operation of the device is as follows:

Suppose the chest A to be empty, insert the spring seat B in approximately the center of the chest, then put in place the container C resting on said seat, then pack in the ice or freezing mixture to the desired height. The gaskets D and D' being in place, then put on the inner cover E, which will center and hold the container C in the proper position, then adjust the clamps F, then put on the outer cover G with the lid and suction cap carried thereby. The mixture to be frozen may be inserted in the container either before the cover G is put in place or afterwards.

In case the mixture to be frozen is inserted after the cover is put on, of course, the lid H would be raised for this purpose.

In the course of time, the mixture contained in the container will be frozen, and when it is desired to dispense the same, the lid H may be lifted, as indicated in dotted lines in Fig. 2, and the frozen food may be taken out in the usual way.

It will be obvious that when the lid is open, the suction cap will tend to create a partial vacuum, moving some of the air from the upper portion of the container C, which will be replaced by warmer air from the atmosphere, and when the cover is closed again this warmer air will be cooled and become more dense, tending to create a suction on the inside of the can, which will serve in keeping the suction cap tight in place, and will prevent any foreign matter from getting in while the lid is down.

Furthermore, it will be noted that there is no possibility of the freezing mixture getting into the container, thus avoiding the salty taste so often experienced in buying ice-cream, frozen custards or the like. This salty taste is not only objectionable in itself, but is an evidence of unsanitary conditions.

After the container is empty, the device may be refilled as hereinbefore described.

It will thus be seen that I provide, a simple, efficient, convenient and sanitary arrangement for storage and dispensing of frozen food products.

While I have disclosed an embodiment of the invention in the form preferred by me, it will be obvious that various changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:

1. A sanitary cabinet for storing and dispensing frozen food products, comprising a chest, a spring seat centrally mounted in said chest, a container for the frozen food mounted on said spring seat and spaced apart from the bottom and side walls of said chest, an inner cover supported on gaskets and fitting snugly between the sides of said container and the side walls of said chest, an upper cover fitting over the top of said chest, and provided with a central opening therein, a hinged lid normally closing said opening in the upper cover, a suction cap having a gasket on the lower face thereof adapted to close the top of said container, and a spring connection between said lid and said suction cap.

2. A sanitary cabinet for storing and dispensing frozen food products, comprising a chest, a container for the frozen food spaced apart from the bottom and side walls of said chest, an inner cover supported on gaskets and fitting snugly between the sides of said container and the side walls of said chest, an upper cover fitting over the top of said chest, and provided with a central opening therein, a hinged lid normally closing said opening in the upper cover, a suction cap having a gasket on the lower face thereof adapted to close the top of said container, and a spring connection between said lid and said suction cap.

PHIL H. LEWIS.